United States Patent [19]
Hill et al.

[11] 3,722,536
[45] Mar. 27, 1973

[54] MONITOR PRESSURE REGULATOR ASSEMBLY

[75] Inventors: George Edward Hill, Fullerton, Calif.; Bruce Warren Tomlin, Glen Ellyn, Ill.

[73] Assignee: The Singer Company, New York, N.Y.

[22] Filed: Dec. 17, 1971

[21] Appl. No.: 209,172

Related U.S. Application Data

[63] Continuation of Ser. No. 61,916, Aug. 7, 1970, abandoned.

[52] U.S. Cl. ...137/505.46, 137/505.38, 137/505.47, 137/613
[51] Int. Cl. ............................................. F16k 17/02
[58] Field of Search...137/116.3, 116.5, 505.12, 505.46,
  137/505.47, 613; 48/191, 192

[56] References Cited

UNITED STATES PATENTS

| | | | |
|---|---|---|---|
| 3,542,052 | 11/1970 | Irwin | 137/116.5 |
| 1,883,690 | 10/1932 | Gilgenberg | 137/505.12 |
| 3,481,356 | 12/1969 | McQueen | 137/110 |
| 3,003,520 | 10/1961 | Corey | 137/484.8 X |
| 2,619,983 | 12/1952 | Roberts | 137/505.47 X |
| 3,424,194 | 1/1969 | Kruzan | 137/505.46 X |
| 2,816,561 | 12/1957 | Krueger | 137/505.12 X |

*Primary Examiner*—Harold W. Weakley
*Attorney*—Lyon & Lyon

[57] ABSTRACT

A central member connects two duplicate pressure regulator assemblies of the spring-urged diaphragm type, and this central member contains an orifice piece having a bore with a seat at each end of the bore. Separate valve heads each operated by one of the pressure regulator assemblies close against one of the seats, respectively. The central member has an inlet communicating with one of the seats and its respective valve head, and also has an outlet communicating with the other seat and its respective valve head. Pitot tubes establish communication between the outlet and pressure chambers on one side of each diaphragm. The regulator assembly operating the valve head on the downstream side of the orifice piece normally regulates gas pressure at the outlet, but, upon failure of that regulator assembly, the other regulator assembly automatically takes over control.

1 Claim, 6 Drawing Figures

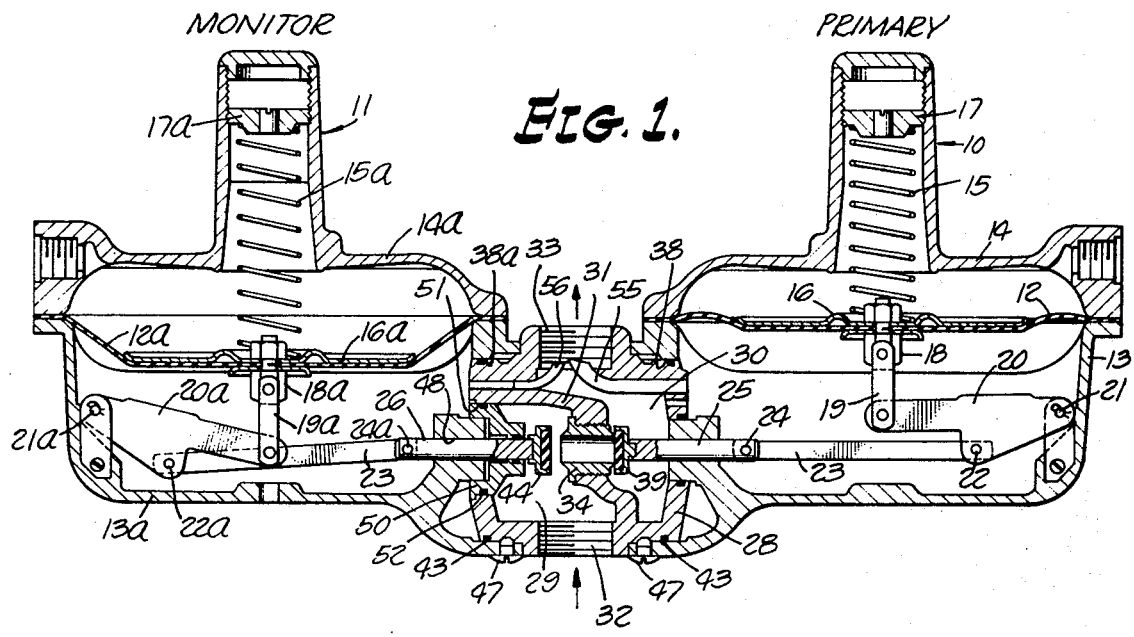

MONITOR PRESSURE REGULATOR ASSEMBLY

This is a continuation of application Ser. No. 61,916, filed Aug. 7, 1970, now abandoned.

This invention relates to gas pressure regulators and is particularly directed to improvements in a monitor type regulator system in which two gas pressure regulators are mounted in series. In conventional systems of this type, two duplicate pressure regulators are spaced along a gas delivery pipe each having its own valve. The upstream regulator has a pressure monitoring line connected to the pipe downstream from the second regulator. In this conventional system, the second regulator is the "primary" regulator, and it controls the downstream pressure in the pipe as long as it is working satisfactorily. Should it fail to operate properly, the increase in downstream pressure is reflected through the monitoring line, back to the first regulator or "monitor", and this increase in pressure causes the monitor regulator to take over the function previously performed by the primary regulator. In this conventional system, two valve heads are required, separated by a section of pipe.

The device of the present invention uses a central valve chamber member which removably supports both of the duplicate pressure regulator assemblies, and this central member is provided with a single inlet and a single outlet. The central member has a wall dividing its interior between the inlet and outlet and has an orifice piece removably mounted in the wall and provided with a bore. Two valve seats are provided, one at each end of the bore, and a separate valve head is positioned to close against each seat. Each valve head is operated by one of the duplicate pressure regulator assemblies, respectively. The outlet communicates with one of the valve heads and its seat, and the inlet communicates with the other valve head and its seat. The result is that the valve head downstream from the orifice piece normally acts to restrict flow through the bore in the orifice piece, while the other valve head, exposed to full inlet pressure, is normally retracted away from its seat. The primary regulator, therefore, operates the downstream valve head, and the monitor regulator operates the upstream valve head, but only in the event of failure of the primary regulator.

Other objects and advantages will appear hereinafter.

In the drawings:

FIG. 1 is a sectional elevation showing a preferred embodiment of this invention.

FIG. 2 is an enlargement showing certain of the parts shown in FIG. 1.

FIG. 3 is a transverse sectional view taken substantially on the lines 3—3 as shown in FIG. 2.

FIG. 4 is a diagram taken substantially on the lines 4—4 as shown in FIG. 2.

Figure 5:
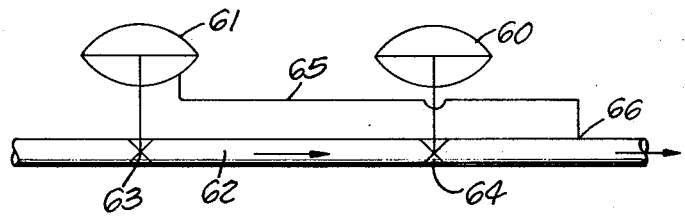
FIG. 5 is a diagram showing a prior art device.

Referring to the drawings, the primary regulator generally designated 10 and the monitor regulator generally designated 11 are substantial duplicates. Each is provided with a flexible diaphragm 12 clamped around its periphery between a stationary body 13 and a stationary bonnet 14. A coil compression spring 15 engages the diaphragm backup plate 16 at one end and engages the adjusting nut 17 at the other end. The central portion of the diaphragm 12 and plate 16 are clamped by the member 18 connected by link 19 to the lever 20. The lever 20 is pivoted to the base 13 at 21 and is pivotally connected at 22 to the link 23. This link 23 is pivotally connected at 24 to the main valve plunger 25 or 26. The valve plunger 25 is operated by the primary regulator 10 and the valve plunger 26 is operated by the monitor regulator 11.

A central valve chamber member 28 is provided with an inlet cavity 29 and an outlet cavity 30, separated by a divider wall 31. A gas inlet opening 32 communicates with the inlet cavity 29 and a gas outlet opening 33 communicates with the cavity 30. An orifice piece 34 is threaded into the wall 31 and is provided with a straight cylindrical bore 35 extending therethrough. A valve seat 36 is formed at one end of the bore within the cavity 29 and another valve seat 37 is formed at the other end of the bore within the cavity 30. The valve plungers 25 and 26, the axis of the bore 35, and the valve seats 36 and 37 are all coaxial. Each of the regulator bodies 13 and 13a is removably mounted on the valve chamber member 28; projections on the chamber member 28 are received in openings 38 and 38a on the regulator bodies and leakage is prevented by seal rings 43. Fasteners 47 hold the parts in assembled position.

The valve head 39 is provided with a nonmetallic disc 40 adapted to engage the seat 37. This valve head 39 is secured to the valve plunger 25 ky means of the pin 41. The valve plunger 25 is slidably mounted in the bore 42 for movement toward and away from the seat 37. The valve head 44 is provided with a nonmetallic disc 45 adapted to engage the seat 36 and is mounted on the valve plunger 26 by means of the pin 46. The valve plunger 26 is slidably received in a bore 48 (FIG. 1) and extends through a bore 49 provided in a bushing 50 sealed within an opening 51 in the member 28. A seal ring 52 prevents leakage between the bushing 50 and the member 28. Another seal ring 53 carried by the bushing 50 slidably engages the outer surface of the valve plunger 26 to form a seal.

The space under the diaphragm 12 in the primary regulator 10 is placed in communication with the outlet 33 by means of the pitot tube 55. Similarly, the space under the diaphragm in the monitor regulator 11 communicates with the outlet 33 through the pitot tube 56.

In operation, gas under pressure is supplied to the inlet 32 and gas under reduced pressure emerges through the outlet 33. The pressure in the inlet chamber 29 is normally higher than that in the outlet chamber 30 with the result that the valve plunger 26 in the monitor regulator 11 is moved away from the seat 36 to supplement the action of its respective diaphragm spring. Gas passes through the bore 35 in the orifice seat 34 in the direction shown by the arrow in FIG. 2, emerging between the seat 37 and the disc 40 of the valve head 39. The diaphragm 12, spring 15, and linkage 18, 19, 20 and 23 operate in the usual manner, with the force of the spring 15 balancing the force due to pressure under the diaphragm 12. If the pressure at the outlet 33 falls below a desired value, the spring 15 moves the diaphragm 12 downward and this action causes the valve plunger 25 to be retracted away from the seat 37 to increase the flow of gas into the cavity 30 and into the outlet 33. When the pressure at the outlet 33 builds up to the desired intensity, the increase in pressure under the diaphragm 12 causes it to move upward and thereby move the valve head 39 and disc 40 toward the valve seat 37 to throttle the flow and thus produce the desired downstream pressure. This is the normal operation of the device, with the monitor regulator 11 in standby position, not affecting the rate of flow of gas from the inlet 32 to the outlet 33.

In the event that the disc 40 of the valve head 39 should fail to close against the valve seat 37, for any reason, or should fail properly to throttle the flow of gas from the bore 35, for any reason, pressure builds up to undesirable values at the outlet 33, and this pressure is reflected through the pitot tube 56 to the space within the monitor regulator 11 under the diaphragm 12a. This increase in pressure causes the diaphragm 12a to move upward against the action of the spring 15a and thereby cause the lever 20a to move the valve plunger 26 and valve head 44 toward the seat 36. If the pressure at the outlet 33 remains above an acceptable limit, the disc 45 is closed against the seat 36 to prevent flow through the bore 35. When the pressure in the outlet 33 returns to an acceptable value, the reduction of pressure in the chamber below the diaphragm 12a permits the spring 15a to expand and move the plunger 26 and valve head 44 away from the seat 36. The disc 45 is moved away from the seat 36 only for a sufficient distance to effect desired throttling of the flow of gas, so that pressure at the outlet 33 is controlled by action of the monitor regulator 11.

The prior art device shown in the diagram of FIG. 5 employs two identical pressure regulators 60 and 61 of the same general type of the regulators 10 and 11 as shown in FIG. 1. However, a length of pipe 62 extends between the main valve 63 of the regulator 61 and the main valve 64 of the regulator 60. Moreover, a pressure-sensing line 65 extends from the chamber beneath the diaphragm of the regulator 61 to a connection 66 on the gas delivery pipe downstream from the valve 64. The device of the present invention eliminates the length of pipe 62 between the regulators and eliminates the sensor line 65. Furthermore, the monitor regulator 11 and the primary regulator 10 can be set at the identical delivery pressure. The monitor regulator 11 does not reduce the capacity of the system because it has virtually no pressure drop across it, and remains fully stroked when in the monitor position. Only one valve seat member 34 is required, and both regulators 10 and 11 can easily be removed for seat disc and orifice inspection. The capacity of the monitor regulator 11, with internal static, is identical to that of the primary regulator 10. The device of the present invention requires less space and fewer man hours for its installation because of the single valve seat member design. Moreover, an ordinary pressure-reducing system using a single regulator may be converted to this improved monitor system by simply replacing the conventional regulator with the device of the present invention. No additional piping is required.

The operation of the device of the present invention may be considered in its four modes of operation, which are: (a) standby, (b) the monitor transition, (c) the regulating monitor, and (d) the system resetting. FIG 1 shows the monitor regulator 11 in standby position, with the valve head 44 and disc 45 retracted away from the seat 36. The parts remain in this retracted position by reason of the higher pressure in the inlet cavity 29 as compared to the pressure below the diaphragm 12a in the monitor regulator 11.

Figure 6:
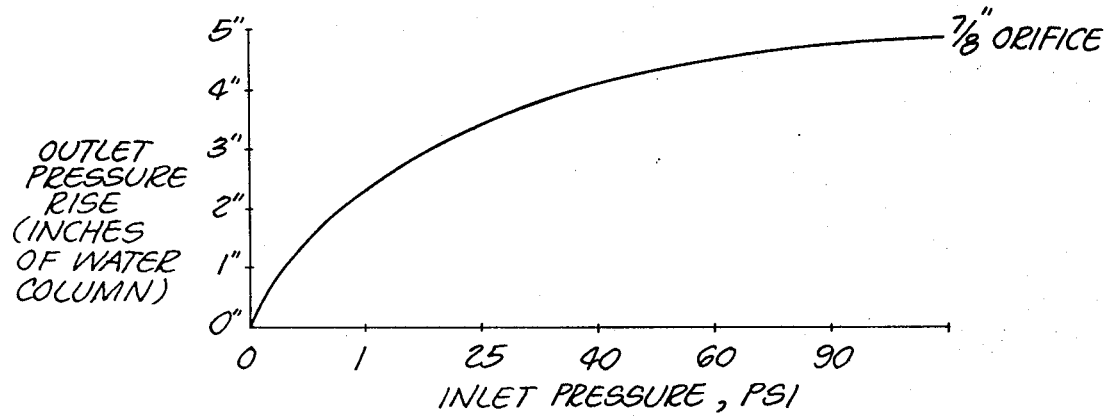
FIG. 6 is a chart showing the relationship between Inlet Pressure (PSI) and Outlet Pressure Rise (inches of water column).

The monitor transition pressure is the momentary rise in outlet pressure necessary to bring the monitor regulator 11 into operation upon failure of the primary regulator 10. An increase in outlet pressure above the monitor spring setting is required in order to bring the monitor regulator into operation. This rise is a fixed pressure, depending on the inlet pressure and the plunger cross-sectional area. The latter being a constant, it is seen graphically in FIG. 6 that inlet pressure magnitude determines the required outlet pressure needed to move the seat disc 45 into a throttling position. It will be observed that the diameter of the bore 35 is greater than the diameter of the plunger 26 that passes through the seal ring 53. Thus, in the diagram of FIG. 4, the annular area A is the net effective area subjected to pressures on opposite sides of the valve head 44. The pressure in the flow passage 35 acts on one side of this area, and the higher pressure in the inlet cavity 29 acts on the other side of this area, when the seat disc 45 approaches the seat 36 to throttle the flow. A net force differential exists only within the annular area A. The opening and closing forces extended by fluid pressure on the plunger 26 may be expressed in equation form:

closing force = (annular area A) × $(P_1-P_2)$
opening force = (area B) × $(P_1-P_2)$ where $P_1$ =high pressure and $P_2$ =low pressure. A reversal of force on the plunger 26 therefore occurs when the monitor regulator begins its pressure regulating function.

When the monitor regulator 11 is operating, it performs as if it were the only regulator in the device. It operates to move the valve head 44 toward and away from the seat 36 in response to pressure changes at the outlet 33.

In the system resetting function, the pressure in the bore 35 exceeds the pressure in the discharge cavity 30 as soon as the valve seat 39 and disc 40 begin throttling flow past the seat 37. When the pressure in the bore 35 approaches the supply pressure in the inlet cavity 29, the valve head 44 is forced away from the seat 36 and moves to retracted position. The monitor regulator 11 then begins its standby function.

Having fully described our invention, it is to be understood that we are not to be limited to the details herein set forth, but that our invention is of the full scope of the appended claims.

We claim:

1. In combination, a primary regulator and a monitor regulator, the regulators being duplicates and having the same capacity; said regulators each having a body, a valve plunger projecting from the body, adjustable resilient means for moving the valve plunger axially in one direction, and diaphragm means responsive to fluid pressure within the body for moving the valve plunger axially in the other direction; a central member having walls connected to both of said regulator bodies and having a center wall dividing the interior of the member into an inlet cavity and an outlet cavity, the member having an inlet to the inlet cavity and an outlet to the outlet cavity, means providing a bore through said center wall communicating with both cavities; two valve seats of the same effective diameter, one in each cavity at each end of said bore; said valve plungers each projecting through a wall of said member into one of said cavities, respectively, and each having a valve head adapted to cooperate with one of said seats; respectively, to throttle fluid flow, the valve head of the primary regulator closing against the direction of flow through said bore, and the valve head of the monitor regulator closing in the same direction as flow through said bore; passage means establishing communication between said outlet and the interiors of said regulator bodies; and seal means carried on a wall of said central member slidably engaging the valve plunger of the monitor regulator to prevent leakage from the inlet cavity along said plunger, the diameter of the sliding seal being substantially less than the effective diameter of the valve seat in the inlet cavity; whereby excessive fluid pressure at the outlet caused by failure of the valve head of the primary regulator to close against its seat causes the valve head of the monitor regulator to cooperate with its seat to develop a reversal of the direction of force applied to the monitor regulator plunger by fluid pressure in the inlet cavity, and thereby regulate the flow of fluid into the outlet cavity in the same manner as the primary regulator prior to such failure.

* * * * *